PARAMETRIC CIRCUITS

Filed April 24, 1961 3 Sheets-Sheet 1

INVENTOR
ROBERT H. DENNARD

BY Stephen J. Limanek
ATTORNEY

United States Patent Office 3,239,679
Patented Mar. 8, 1966

3,239,679

PARAMETRIC CIRCUITS

Robert H. Dennard, Ossining, N.Y., assignor to International Business Machines Corporation, New York, N.Y., a corporation of New York Filed Apr. 24, 1961, Ser. No. 104,974
16 Claims. (Cl. 307—88)

Figure 1:
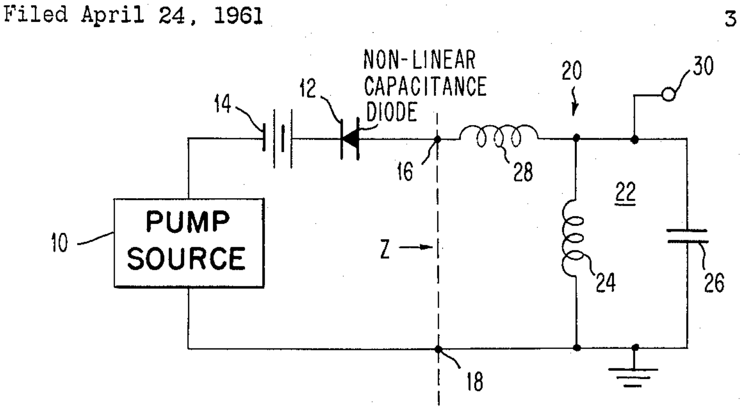

This invention relates to subharmonic generators or oscillators and more particularly to third-order subharmonic generators which may be used as logical elements in an electronic data processing system.

In recent years there has been described in the literature phase-locked circuits which may be used in logical machines operating at high speeds and having long life and great reliability. These circuits are designed to provide at least two stable phases of an alternating current signal, each stable phase representing one value of a bit of information. To produce the multiphase circuits a non-linear capacitance, generally provided by a non-linear capacitance diode, is utilized in one form of these circuits, for example, as described in U.S. Patent 2,815,488 granted to J. VonNeumann on December 3, 1957. In another form of these circuits a non-linear inductance may be used. Circuits exhibiting the principles described in the above mentioned phase-locked circuits have been generally referred to as parametric circuits, such as parametric oscillators, parametric amplifiers, etc. A comprehensive list of articles on parametric circuits may be found in the May 1960 issue of the Proceedings of the IRE on pages 848–853.

Known commercially available data processing machines or computers in operation today utilize binary logic and have bistable circuits providing signals representing a "1" and a "0." The feasibility of establishing a higher order of computer logic, such as a ternary or quaternary, has been delayed due to the unavailability of a simple and inexpensive inherently multistable switching element capable of representing three or more different digits, for example, "0," "1" and "2." Heretofore elements capable of providing three or more states have been found to be insufficiently reliable in operation within a higher order logic system.

As described in the literature, for example, in the VonNeumann patent, phase logic may be utilized in parametric circuits which provide a subharmonic of the frequency of the carrier or pump voltage applied to the parametric circuit. It has been found that the second subharmonic of the carrier wave, i.e., the subharmonic having a frequency equal to one-half the frequency of the carrier wave, is phase stable at two phase positions of the subharmonic frequency, mutually differing by 180 degrees. In order to produce the second subharmonic with a given one of the two phases in the parametric circuit, a control voltage having a frequency equal to the frequency of the subharmonic wave and having the desired phase derived from an external source is applied to a tank of the parametric circuit which is tuned approximately to the second subharmonic frequency. This control voltage of predetermined or given phase, which can be referred to as the seeding voltage, may be of an amplitude sufficiently large to override the subharmonic wave produced in the tuned circuit in order to switch the voltage in the tuned circuit from one stable phase to the other stable phase, or a seeding voltage of a relatively low amplitude may be used by increasing the carrier wave amplitude from a low value to a normal or operating value while the seeding voltage is applied to the circuit. The phase of the subharmonic voltage in the tuned circuit will correspond to the phase of the control voltage and an amplified subharmonic voltage will be produced at the output of the parametric circuit.

A simple parametric circuit arrangement for producing subharmonics of a carrier voltage consists of a linear inductor serially connected to a semiconductor diode having a non-linear junction capacitance. When the diode has a capacitance characteristic which is sharply non-linear, the circuit is theoretically capable of producing subharmonics of any order. As the applied voltage is increased in amplitude from a low or zero value, a second subharmonic is first produced. A further increase in the carrier voltage amplitude produces a third-order oscillation in the parametric circuit. Increasing the amplitude of the carrier voltage still further produces higher and higher orders of subharmonics up to some practical limit which may be as high as ten or twelve. This type of circuit has several disadvantages for a ternary or higher order logic system. It operates in a fairly narrow range of carrier voltage, thus close tolerances must be maintained. A serious disadvantage of this circuit is that the phase of oscillation is difficult to control due in part to the sharp capacitance non-linearity. When the carrier voltage is first applied to the circuit, the tuned circuit does not proceed from the non-oscillating state directly to the third-order oscillation but first passes through the second-order mode of oscillation before stabilizing at the third-order mode. Thus, it can be seen that the final phase of oscillation is influenced by the random behavior in the transitional period before the circuit is stabilized at the third subharmonic as well as by a small seeding signal which is applied to the tuned circuit. A large seeding signal would be necessary to assure reliable operation. In other words, the gain of the circuit is limited.

An object of this invention is to provide an improved subharmonic generator.

Another object of this invention is to provide an improved third-order subharmonic generator which is of simple construction.

A further object of this invention is to provide an improved third-order subharmonic generator which may be utilized as a logic element in a data processing system.

Yet a further object of this invention is to provide a subharmonic generator which produces a third-order subharmonic but which is substantially incapable of producing a second-order subharmonic.

Yet another object of this invention is to provide a subharmonic generator which operates even when the carrier amplitude or frequency, or both, vary over a substantial range.

Still another object of this invention is to provide an improved subharmonic generator that has wide tolerances of circuit values.

In accordance with this invention, an odd-order subharmonic generator is provided which includes a non-linear element and a reactance network arranged to prevent the forming therein of a second-order subharmonic of a given carrier frequency. In one aspect of the invention, the generator includes means for applying a carrier voltage having a given frequency to a circuit including a non-linear element which is coupled to impedance means having a substantially low impedance value at the frequency of an undesired subharmonic of the carrier and a substantially high impedance at a desired subharmonic of the carrier voltage. In a second aspect of the invention, the generator is designed in the form of a symmetrical circuit which inherently suppresses or prevents the formation of even-order subharmonics therein.

An important feature of the present invention is that the reactance network included in the parametric circuit requires no careful tuning with respect to a desired subharmonic of a carrier voltage.

An important advantage of the present invention is that the circuit is of simple construction and provides an odd-order subharmonic having stable operation for wide ranges of carrier frequency and amplitude.

The foregoing and other objects, features and advantages of the invention will be apparent from the following more particular description of preferred embodiments of the invention, as illustrated in the accompanying drawings.

Figure 3:
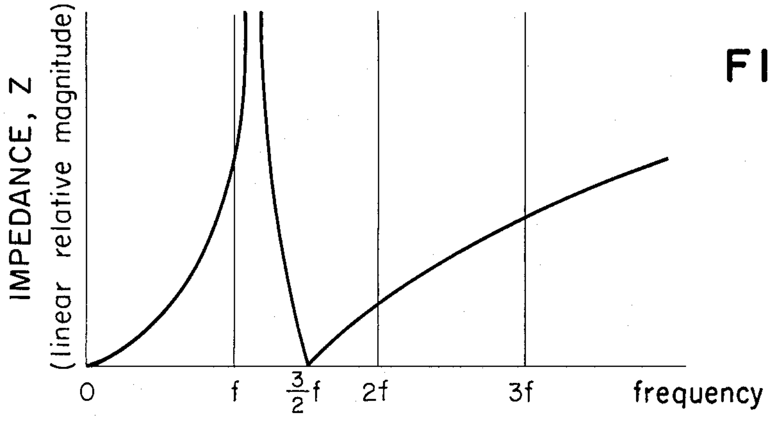
Figure 4:
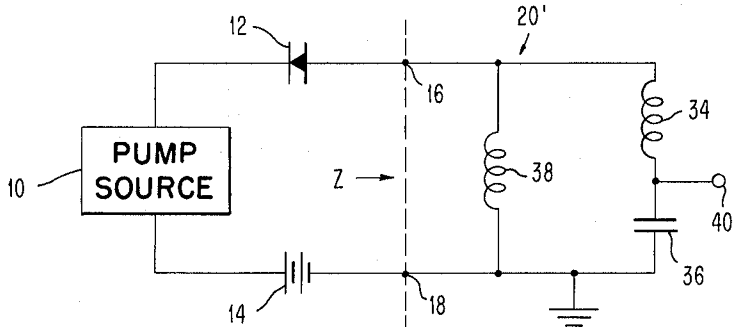
Figure 2:
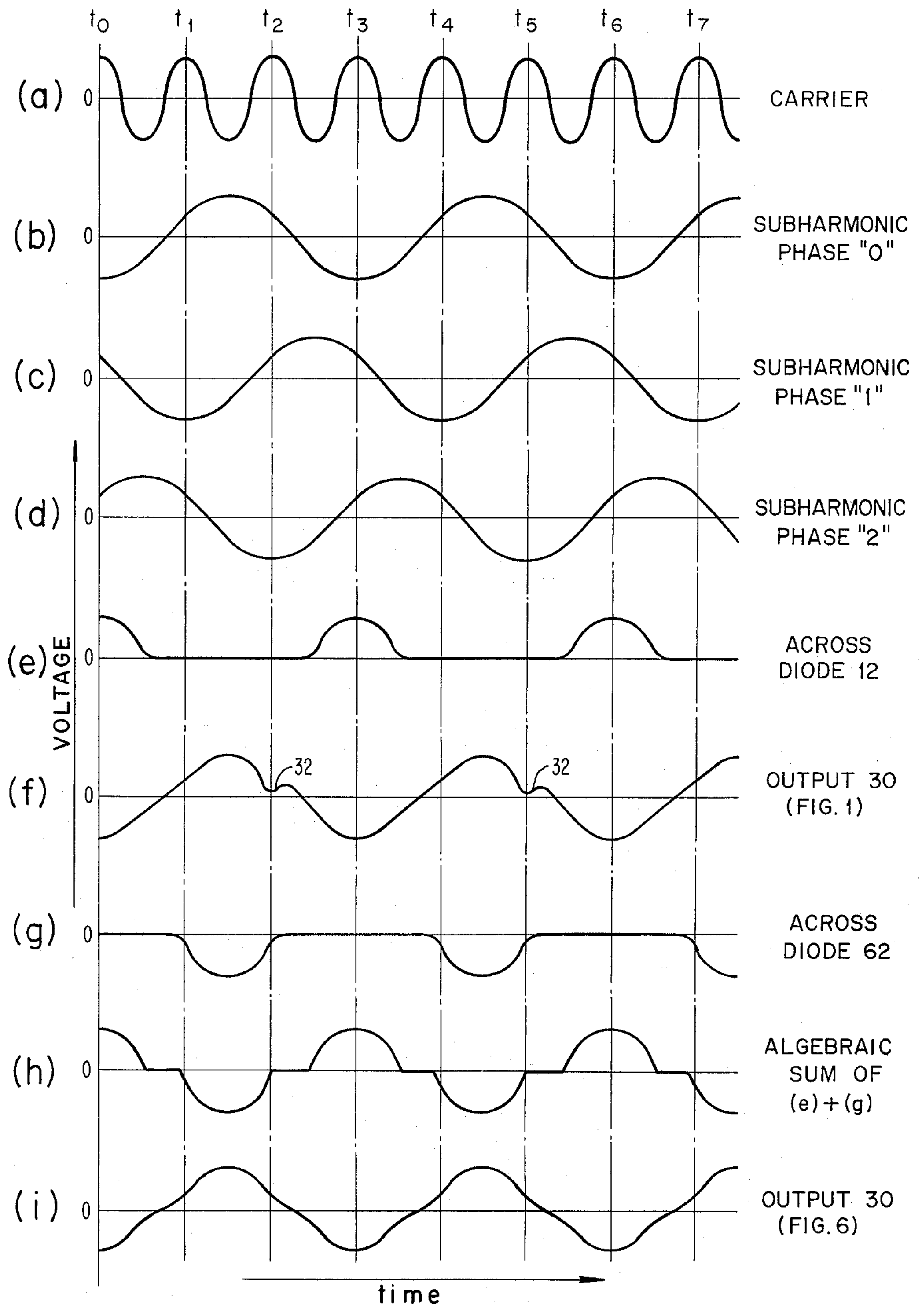
Figure 5:
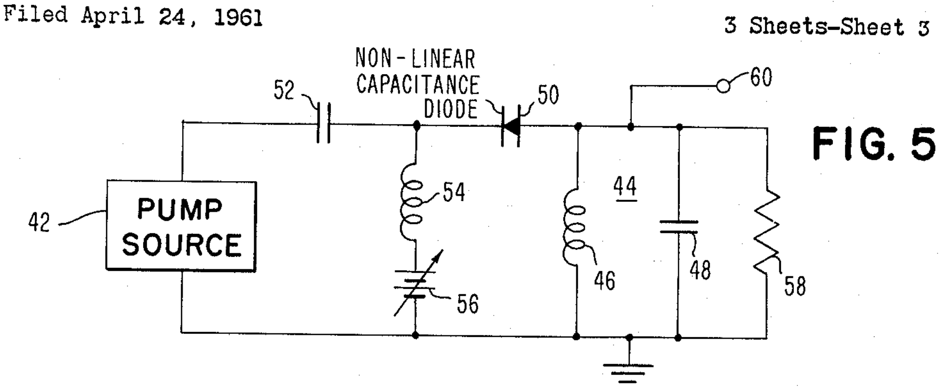
Figure 6:
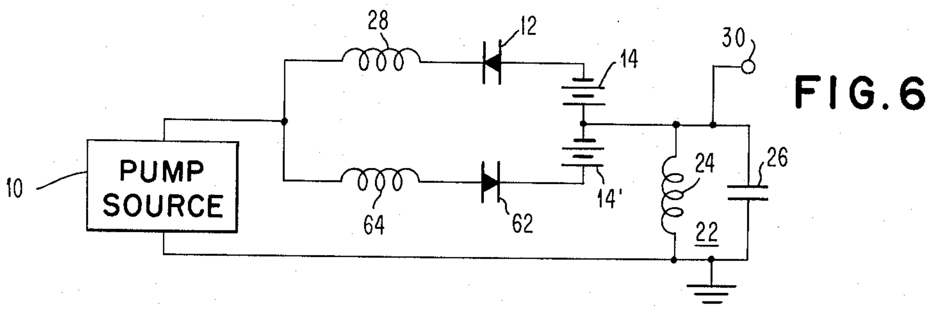
Figure 7:
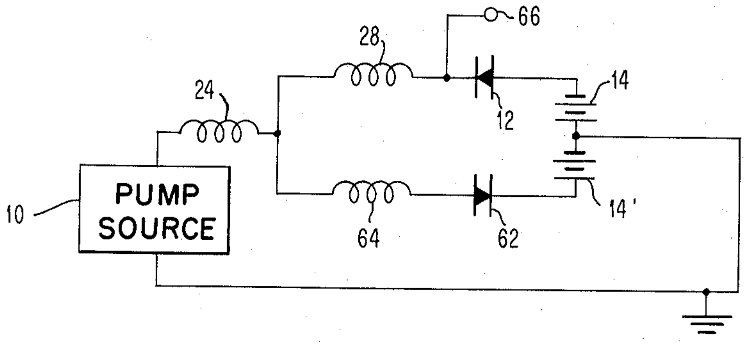
Figure 8:
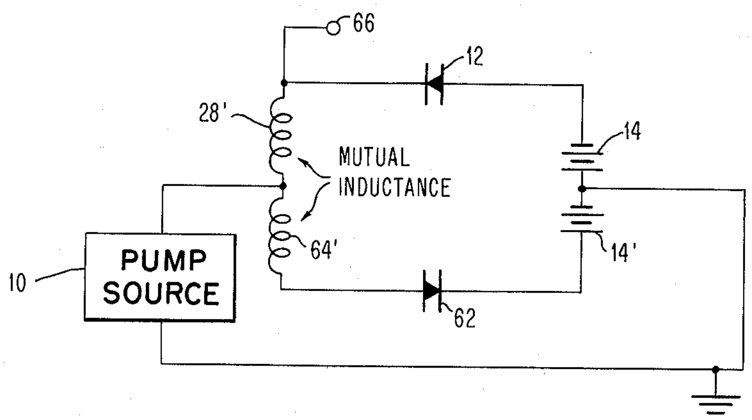

In the drawings:

FIG. 1 illustrates a subharmonic circuit in accordance with the teachings of the present invention, FIG. 2 shows a series of graphs illustrating various voltages useful in describing the operation of the circuits of the present invention, FIG. 3 is a graph illustrating the impedance-frequency relationship in the circuit shown in FIG. 1, FIGS. 4 and 5 illustrate modifications of the circuit shown in FIG. 1, FIG. 6 illustrates a circuit of the present invention which is similar to the circuit shown in FIG. 1 but which utilizes two non-linear elements, FIGS. 7 and 8 illustrate modifications of the circuit shown in FIG. 6 of the drawing.

Referring to FIG. 1 in more detail, there is shown a parametric circuit having a low impedance pump source 10 providing carrier wave energy at a given frequency 3*f*, e.g., 25 megacycles per second. A non-linear capacitance diode 12, which may be a V56 diode, manufactured by Pacific Semiconductors, Inc., is connected to the pump source 10 through a low impedance direct current bias source or battery 14, which may provide a fixed bias voltage for diode 12 or, if desired, an adjustable voltage. The series circuit including diode 12, battery 14 and pump source 10 is terminated at terminals 16 and 18. Connected also to the terminals 16 and 18 is a network 20 which comprises a parallel resonant circuit 22 including a first linear inductor 24 connected in parallel with a linear capacitor 26 tuned to, preferably, a frequency higher than the third subharmonic of the carrier wave energy from pump source 10, but less than the second subharmonic of said pump frequency. A second inductor 28 is connected between the resonant circuit 22 and the terminal 16. An input-output terminal 30 is coupled to the resonant circuit 22 for applying input signals thereto and deriving output signals therefrom.

In the operation of the circuit illustrated in FIG. 1 the amplitude of the carrier wave of frequency 3*f* produced by the pump source 10 is increased from substantially a zero value to a predetermined normal operating value while a control signal or seed having a given phase and a frequency *f*, which is the third subharmonic of the carrier wave of frequency 3*f*, is applied to the resonant circuit 22. When the carrier wave amplitude reaches its normal operating value there will be produced in the resonant circuit 22 an amplified signal having a phase and frequency corresponding to that of the control signal or seed. It should be understood that the control signal may differ in phase from the desired output phase by a considerable amount, for example +50 degrees, and still produce the desired output signal phase. In a circuit of the type illustrated in FIG. 1 the resonant circuit 22 can be tuned to a frequency substantially equal to or preferably slightly greater than the carrier frequency divided by an integer *n* producing an *n*th order subharmonic in the resonant circuit 22 capable of having *n* stable phases. Due to the interaction of the elements in the circuit of FIG. 1, the desired subharmonic will be produced in the resonant circuit 22 and an idler voltage having a frequency 2*f* which is the difference between the carrier frequency and the signal or desired subharmonic frequency will be produced primarily across the second inductor 28. When the resonant circuit 22 is tuned so as to produce a frequency *f* which is the third subharmonic of the carrier wave produced by pump source 10, the phase of the subharmonic voltage will stabilize at one of three possible phases, each separated 120 degrees from the other two. Thus, when a control signal of a frequency of the third subharmonic *f* is applied to the resonant circuit 22 the phase of the voltage produced in the resonant circuit 22 will correspond to that of the control signal. Each of the three possible phase stable states may be assigned one of three digits, such as 0, 1 and 2, in the case where *n* is equal to 3 and the output state of the parametric circuit is determined by the phase of one or more of the input signals, thus performing a logic operation in the circuit.

Referring to FIG. 2 of the drawing, the carrier wave produced by the pump source 10 is shown in graph (*a*) and the three possible stable phases which can be produced in the resonant circuit 22 at the third subharmonic of this carrier wave are shown in idealized form by curves (*b*), (*c*) and (*d*). Curve (*e*) illustrates the wave observed across diode 12 which has a fundamental frequency equal to *f* when the carrier frequency is 3*f*, and curve (*f*) illustrates the output wave observed at terminal 30 in the circuit of FIG. 1 when a signal of the frequency and phase of the wave illustrated at curve (*f*) was applied to terminal 30. It can be seen that the phase of the output voltage illustrated by curve (*f*) is the same as the phase of the idealized wave illustrated in curve (*b*) but the wave form differs slightly therefrom, being unsymmetrical in the region 32 of each cycle due to the presence of small components of harmonically related frequencies such as 2*f*, 3*f*, etc. The impedance Z of network 20 as viewed from terminals 16 and 18 at various frequencies is illustrated in FIG. 3 of the drawing. The phase angle of the impedance Z is substantially +90 degrees for frequencies between 0 and the resonant frequency of the circuit 22, which frequency is somewhat greater than the frequency *f*, −90 degrees for frequencies between the resonant frequency of circuit 22 and the frequency 3*f*/2, and again +90 degrees for frequencies greater than 3*f*/2. Also it will be understood that FIG. 3 is idealized in that no resistive components of the various elements have been considered in plotting the curve shown therein. In using practical elements, wherein resistive components are present, the actual impedance function will of course differ somewhat from that indicated in FIG. 3. It has been found this difference does not impair the circuit operation when readily available components of reasonable quality are used in the circuit. In fact it has been found that additional resistance when added to circuits constructed of these practical elements may improve the performance in some respects by making the operation more stable and less critical to circuit values.

It can be seen from FIG. 3 of the drawing that the impedance at the frequency *f*, i.e., the third subharmonic, is relatively high since the resonant circuit 22 is tuned to a peak at a frequency just somewhat larger than this frequency *f*. Thus, substantially all of the voltage at this frequency will be produced across the resonant circuit 22 and will be available at the input-output terminal 30. At the frequency 2*f* the impedance of the resonant circuit 22 has a value which is considerably lower than the impedance at the subharmonic frequency *f*, since the resonant circuit 22 is tuned more nearly to the subharmonic frequency *f*, and the circuit can be readily designed so that only a small portion of the voltage drop in the network 20 will be across the resonant circuit 22 and the major portion of the voltage drop in the network 20 between terminals 16 and 18 will be across the second linear inductor 28. Of course, it should be understood that the circuit voltages can be represented as vectors, and are added or subtracted in a vector sense. Thus, only a relatively small amount of voltage at the frequency 2*f* will appear at the output terminal 30. Although it appears from the graph in FIG. 3 of the drawing that a substantially high impedance is produced for voltages having a frequency 3*f*, that is, the carrier frequency, the portion of the voltage having a frequency $3f$ appearing at output terminal 30 is very small since the capacitor 26 of the circuit 22 operates effectively as a low impedance shunting element at this high frequency. The major portion of the voltage drop of the frequency $3f$ will thus be produced also across the second inductor 28.

As indicated by the graph shown in FIG. 3 of the drawing, the impedance at the second subharmonic frequency $3f/2$ is substantially zero and, therefore, only a very small or no component of the second subharmonic will be produced at the output terminal 30. Correspondingly, the second-order subharmonic of the carrier frequency cannot be produced in the diode 12 since it is shorted out by the network 20 acting through the low-impedance pump source 10. This is an important feature of this circuit since it is known that when the amplitude of the carrier wave is being increased from zero to a steady state or operating value there is a tendency for a parametric circuit to produce a second-order subharmonic before producing a third-order subharmonic. If the second subharmonic were introduced in the resonant circuit 22 before the third subharmonic were produced, it is possible that the presence of the second subharmonic would adversely influence the resonant circuit 22 so as to set up in the resonant circuit 22 a third subharmonic of an undesirable phase since the phase of the third subharmonic could at times be influenced more by the behavior of the second-order subharmonic component $3f/2$ during transitional periods than by the phase of a small control or seeding signal of frequency $f$.

FIG. 4 illustrates a circuit of the invention which is similar to the circuit illustrated in FIG. 1 of the drawing. FIG. 4 shows a parametric circuit having the serially connected pump source 10, non-linear capacitance diode 12 and bias voltage 14 terminated at terminals 16 and 18 as in the circuit shown in FIG. 1 of the drawing. Also connected to the terminals 16 and 18 is a network 20' having a first inductor 34 serially connected to a linear capacitor 36 and a second inductor 38 connected across the series combination including first inductor 34 and capacitor 36. An input-output terminal 40 is connected to the common point between the first inductor 34 and the capacitor 36.

The network 20' of FIG. 4 is the electrical equivalent of the network 20 of FIG. 1 as viewed from terminals 16 and 18 and, therefore, is designed so that the impedance thereof viewed from terminals 16 and 18 varies as a function of frequency in the manner indicated in FIG. 3 of the drawing. The voltages produced at the input-output terminal 40 will be of similar form to that of the voltages produced at the input-output terminal 30 of the circuit shown in FIG. 1 of the drawing but of a higher magnitude due to the fact that elements 34 and 36 are near series resonance at the desired output frequency $f$.

FIG. 5 illustrates a parametric circuit which also is a modification of the circuit shown in FIG. 1 of the drawing. The circuit in FIG. 5 includes a pump source 42, a resonant circuit 44 having a first linear inductor 46 and a first linear capacitor 48 and a non-linear capacitance diode 50 serially connected to the resonant circuit 44. The series combination including the resonant circuit 44 and the diode 50 is connected to the pump source 42 through a high impedance, preferably a second linear capacitor 52. A second linear inductor 54 serially connected to a variable bias source 56 is connected across the pump source 42 through the second capacitor 52. A load resistor 58 is connected across the resonant circuit 44 and an input-output terminal 60 is coupled to the resonant circuit 44. It can be readily seen that the circuit illustrated in FIG. 5 of the drawing is very similar to the circuit illustrated in FIG. 1 and that it differs therefrom mainly in that by a Norton transformation the pump source which in FIG. 1 is of a low output impedance or voltage-source type has been replaced in the circuit in FIG. 5 by a high impedance or current-source type consisting of the serial connected pump source 42 and the element 52. Thus, the second inductor 54 in the circuit shown in FIG. 5 is shunted across the pump current source 42, 52, whereas in FIG. 1 the second inductor 28 is serially connected with pump source 10. This alteration can be readily made by merely interchanging the positions of the non-linear capacitance diode 12 and the second linear inductor 28 in the circuit of FIG. 1 and performing a Norton transformation. The load resistor 58 is shown connected across the resonant circuit 44 to provide more stable operation whenever the equivalent shut resistance of the resonant circuit 44 is of a very large value. Of course, its hould be understood that a load resistance may also be included in the network 20 shown in FIG. 1 and in network 20' shown in FIG. 4 of the drawing. The location of the bias 56 for the diode 50 is very convenient when in series with the second inductor 54, as shown, since it can be readily grounded and furthermore does no produce a D.-C. component at the terminal 60.

Since the circuit illustrated in FIG. 5 of the drawing can be made the equivalent of the circuit illustrated in FIG. 1 of the drawing at any desired pump frequency, the operation of the circuit of FIG. 5 is similar to the operation of the circuit of FIG. 1 and the voltages produced at the input-output terminal 60 in FIG. 5 will be similar to the voltages produced at the input-output terminal 30 of the circuit shown in FIG. 1.

As stated hereinabove, the output voltage produced at terminal 30 of the parametric circuit shown in FIG. 1 of the drawing has a unsymmetrical wave shape as shown by curve ($f$) in FIG. 2 of the drawing due to the presence of harmonics, predominantly the frequency $2f$, the second harmonic, of the fundamental output frequency $f$. In order to provide a symmetrical wave at the output of the parametric circuit of the present invention, the circuit shown in FIG. 1 has been modified so as to provide the circuit illustrated in FIG. 6 of the drawing. The circuit in FIG. 6 includes the pump source 10 providing a sinusoidal carrier wave of, e.g., 25 megacycles per second, the nonlinear capacitance diode 12, the bias battery 14, the resonant circuit 22 having the first linear inductor 24 and the linear capacitor 26 and the second linear inductor 28. Additionally the circuit of FIG. 6 comprises a series circuit including a second non-linear capacitance diode 62, a third linear inductor 64 and a bias battery 14'. This series circuit is connected in parallel with the serially connected first diode 12, second inductor 28 and bias battery 14 so that the two diodes 12 and 62 are connected in opposing polarities but similarly biased by the bias batteries 14 and 14', which, if desired, may be combined to form a single battery or direct current supply.

The circuit shown in FIG. 6 operates in a manner very similar to that in which the circuit of FIG. 1 operates. One of the two diodes 12, 62 responds to negative peaks of a pump voltage in the same manner as the other diode responds to positive peaks of the pump voltage. Thus, ie can be seen that the voltage across the first non-linear capacitance diode 12 can be considered as being similar to the voltage developed across the non-linear capacitance diode 12 in the circuit shown in FIG. 1 appearing primarily as a series of positive pulses and will have a waveform as illustrated by curve ($e$) in FIG. 2 of the drawing and a frequency equal to the third subharmonic of the carrier wave illustrated by curve ($a$) in FIG. 2 of the drawing. The voltage produced across the second non-linear capacitance diode 62 can be considered as having a form similar to the form of the wave produced across diode 12 but is of opposite polarity and out of phase therewith by 180 degrees, as shown by curve ($g$) in FIG. 2 of the drawing. The circuit illustrated in FIG. 6 may be considered as comprising essentially two of the more elementary circuits illustrated in FIG. 1 of the drawing, each sharing a common output resonant circuit with the diodes connected in opposite polarities. The resonant circuit besides providing a common ouput also serves as the coupling necessary to produce the proper phase relationship in the two series circuits coupled thereto. The algebraic sum of the voltages illustrated by curves (*e*) and (*g*) of FIG. 2 is shown as curve (*h*) in FIG. 2 of the drawing in which may be considered as an effective source of subharmonic voltage in the circuit. This voltage causes a current flow in the resonant circuit 22 to produce at the output terminal 30 a voltage having a symmetrical waveform free from even harmonics of the fundamental frequency, as illustrated by curve (*i*) in FIG. 2 of the drawing. It can be seen that the circuit illustrated in FIG. 6 of the drawing inherently impedes the formation of even-order harmonics of the fundamental output frequency due to the symmetrical arrangement of the circuit elements with respect to the polarity of the pump voltage. Thereby the output voltage is symmetrical with respect to the time axis.

The circuit illustrated in FIG. 6 has the advantage of being less critical to changes in component values than do the more elementary circuits, such as the circuit illustrated in FIG. 1. The values of first inductor 24 and the capacitor 26 of the resonant circuit 22 are not as restricted as in the elementary circuit. Moreover, it has been found that capacitor 26 is not necessary for third-order subharmonic operation. Very stable third-order subharmonic operation has been obtained over a wide range of input frequencies, for example, from three to nine megacycles per second, with the use of V56 diodes manufactured by Pacific Semiconductors, Inc., when the inductance values of the first, second and third inductors 24, 28 and 64 were each equal to 4.7 microhenries, the bias voltage was zero and a sinusoidal two volts r.m.s. voltage was applied and without the use of the linear capacitor 26. However, the use of the capacitor 26 was found to reduce the carrier voltage required at the pump source 10 to produce the subharmonic since less carrier voltage was developed across the first inductor 24.

FIG. 7 illustrates the circuit shown in FIG. 6 without the use of the capacitor 26 and mentioned hereinabove in the immediately preceding paragraph. In FIG. 8, which shows a modification of the circuit shown in FIG. 7, the first inductor 24 has been eliminated and the inductance provided by inductor 24 has been supplied by a mutual inductance by positioning a first inductor 28′ and a second inductor 64′ so as to provide an inductance therebetween equivalent to the inductance provided by the first inductor 24. As is well known, the inductors 28′ and 64′ of the circuit in FIG. 8 can be arranged to provide a mutual inductance $M=kL$, where L is the inductance of each of the first and second linear inductors 28′ and 64′ and $k$ is the coefficient of coupling between these two inductors 28′, 64′.

The input-output terminal 30 in the circuit shown in FIG. 6 is provided so as to apply an input signal to or derive an output signal from the resonant circuit 22 of FIG. 6 and an input-output terminal 66 shown in FIGS. 7 and 8 is connected to a common point between one of the two diodes and one of the inductors.

It should be understood that the value of the voltage produced by the direct current bias batteries 14 and 14′ in the circuits of the various figures of the drawings may be any value including zero which is required to provide the desired characteristics in the diodes 12 or 62 depending upon the type of diodes used and the frequency at which the circuit is to operate. It also should be understood that, if desired, the circuits of the present invention may utilize a non-linear inductance rather than a non-linear capacitance if the circuits are redrawn to give duals of the circuit shown hereinbefore.

Accordingly, it can be seen that a circuit of simple construction has been provided for a third or higher order logic system which produces an odd-order subharmonic having a symmetrical or substantially symmetrical waveform and which thus can be reversed in polarity without changing the shape of the wave. This feature of the waveform is particularly useful in phase logic circuits where an unsymmetrical waveform causes difficulty in propagating the signal from one stage to a succeeding state through reactive networks or other dispersive media. Furthermore, a parametric circuit has been provided which gives stable subharmonic operation for wide regions of carrier frequency and amplitude.

While the invention has been particularly shown and described with reference to preferred embodiments thereof, it will be understood by those skilled in the art that various changes in form and details may be made therein without departing from the spirit and scope of the invention.

What is claimed is:

1. A subharmonic generator comprising a source of carrier wave energy having a given frequency, a non-linear element and a circuit tuned to a frequency slightly higher than that of an odd-order subharmonic of said given frequency, said element and circuit being coupled to said source and having impedance values such that a second-order subharmonic of said given frequency is prevented from being formed in the generator.

2. A subharmonic generator comprising a source of carrier wave energy having a given frequency, an element having a non-linear capacitance characteristic and impedance means including a linear inductor, said impedance means providing a relatively low impedance at a given subharmonic of the carrier wave energy of said source and a relatively high impedance at a higher order subharmonic than that of said given subharmonic of the carrier wave energy of said source, said element and said impedance means being coupled to said source.

3. A subharmonic generator comprising a source of carrier wave energy having a given frequency, a diode having a non-linear capacitance characteristic and impedance means including a linear inductor and a pair of terminals, said impedance means providing a relatively low impedance at a given subharmonic of the carrier wave energy of said source between said pair of terminals and a relatively high impedance at a higher order subharmonic than that of said given subharmonic of the carrier wave energy of said source between said pair of terminals, said diode and said impedance means being coupled to said source.

4. A subharmonic generator comprising a source of carrier wave energy having a given frequency, a diode having a non-linear capacitance characteristic and impedance means including a circuit tuned to a frequency slightly higher than the frequency of a given subharmonic of the carrier wave energy of said source providing a relatively high impedance at said given subharmonic of the carrier wave energy of said source and a relatively low impedance at a lower order subharmonic than that of said given subharmonic of the carrier wave energy of said source, said diode and said impedance means being coupled to said source.

5. A subharmonic generator comprising a source of carrier wave energy having a given frequency, a diode having a non-linear capacitance characteristic and impedance means including a circuit tuned to a frequency slightly higher than the frequency of a given subharmonic of the carrier wave energy of said source and serially connected to said diode, said impedance means providing a relatively high impedance at said given subharmonic and a relatively low impedance at a lower order subharmonic than that of said given subharmonic of the carrier wave energy of said source, said diode and said impedance means being coupled to said source.

6. A subharmonic generator comprising a source of carrier wave energy having a given frequency, a diode having a non-linear capacitance characteristic and impedance means including a linear inductor and a circuit resonant at a frequency higher than the frequency of a given subharmonic of the carrier wave energy of said source, said inductor and said circuit being serially connected with said diode, said impedance means providing a relatively high impedance at said given subharmonic and a relatively low impedance at a lower order subharmonic than that of said given subharmonic of the carrier wave energy of said source, said serially connected diode, inductor and circuit being coupled to said carrier wave energy source.

7. A subharmonic generator comprising a source of carrier wave energy having a given frequency, a diode having a non-linear capacitance characteristic and impedance means including a linear inductor and a circuit tuned to a frequency slightly higher than the frequency of a given subharmonic of the carrier wave energy of said source, said diode and said tuned circuit being serially interconnected, said linear inductor being connected across the series combination of said diode and said tuned circuit and said carrier wave energy source being connected across said linear inductor.

8. A subharmonic circuit comprising a source of carrier wave energy having a given frequency, a diode having a non-linear capacitance characteristic, impedance means including a linear inductor, said impedance means providing a relatively low impedance at a given subharmonic of the carrier wave energy of said source and a relatively high impedance at a higher order subharmonic of the carrier wave energy of said source, said diode and said impedance means being coupled to said source and means for applying an input signal to said impedance means and for deriving an output signal therefrom.

9. A subharmonic circuit comprising a source of carrier wave energy having a given frequency, a diode having a non-linear capacitance characteristic, impedance means having an output terminal and including a linear inductor providing a relatively low impedance at a given subharmonic of the carrier wave energy of said source and a relatively high impedance at a higher order subharmonic than that of said given subharmonic of the carrier wave energy of said source, said diode and said impedance means being coupled to said source and means coupled to said output terminal for applying an input signal to said terminal and for deriving an output signal from said terminal.

10. A subharmonic circuit comprising a source of carrier wave energy having a given frequency, a diode having a non-linear capacitance characteristic, a linear inductor serially connected with said diode, means for applying a bias voltage to said diode, a parallel resonant circuit tuned to a frequency slightly higher than that of a given subharmonic of the carrier wave energy of said source, said diode, said inductor and said resonant circuit being serially connected across said carrier wave energy source and means including a terminal for applying an input voltage to said tuned circuit and for deriving an output voltage therefrom.

11. A subharmonic circuit comprising a source of carrier wave energy having a given frequency, a linear capacitor and a first linear inductor serially connected with said capacitor, a second linear inductor connected across the serial combination of said first inductor and said capacitor, a diode having a non-linear capacitance characteristic connected serially with said source of carrier wave energy and with the parallel combination of said second inductor and said first inductor and said capacitor, means for applying a direct current bias voltage to said diode and means for applying an input signal across said capacitor and for deriving an output signal therefrom.

12. A subharmonic circuit comprising a source of carrier wave energy having a given frequency, a relatively high impedance element, a parallel resonant circuit tuned to a frequency slightly higher than that of a given subharmonic of the carrier wave energy of said source, a non-linear capacitance diode serially interconnecting said high impedance element and said resonant circuit, said serially connected high impedance element, said diode and said resonant circuit being connected across said carrier wave energy source, a linear inductor, a variable direct current bias source connected serially with said inductor, said serially connected source and inductor being coupled through said high impedance element to said carrier wave energy source and means for applying an input signal to said resonant circuit and for deriving an output signal therefrom.

13. A subharmonic circuit as set forth in claim 12 further including a resistive load coupled across said resonant circuit.

14. A subharmonic circuit comprising a first series circuit including a first linear inductor and a first non-linear capacitance diode coupled to said first inductor in a given polarity, a second series circuit including a second linear inductor and a second non-linear capacitance diode coupled to said second linear inductor in a polarity opposite to that of said first non-linear capacitance diode, means for applying a direct current bias voltage of each of said diodes, a source of carrier wave energy having a given frequency, a parallel resonant circuit tuned to a frequency slightly higher than the frequency of a given subharmonic of the carrier wave energy of said source, said first and second series circuit being connected in parallel and the parallel combination of said first and second series circuit being connected in series with said parallel resonant circuit across said carrier wave energy source and means for applying an input signal to said resonant circuit and for deriving an output signal therefrom.

15. A subharmonic circuit comprising a first series circuit including a first linear inductor and a first non-linear capacitance diode connected to said inductor in a given polarity, a second series circuit including a second inductor and a second non-linear capacitance diode connected to said second linear inductor in a polarity opposite to that in which said first diode is coupled to said first inductor, means for applying a direct current bias voltage to each of said diodes, said first and second series circuits being connected in parallel, a third inductor serially connected with said parallel connected first and secseries circuits, a source of carrier wave energy coupled across the serially connected third linear inductor and the parallel connected first and second series circuits and means for applying an input signal across one of said diodes and for deriving an output signal therefrom.

16. A subharmonic circuit comprising a first series circuit including a first linear inductor and a first non-linear capacitance diode connected to said inductor in a given polarity, a second series circuit including a second series inductor and a second non-linear capacitance diode connected to said second linear inductor in a polarity opposite the polarity in which said first diode is connected to said first inductor, said first and second inductors being disposed with respect to each other so as to produce a mutual inductance therebetween, means for applying a direct current bias voltage to each of said diodes, a source of carrier wave energy connected in parallel with each of said series circuits and means for applying an input signal across one of said diodes and for deriving an output signal therefrom.

References Cited by the Examiner

Pages 229–253, June 1959, Publication I: RCA Review.

Pages 516–523, April 1959, Publication II: Proceedings of the IRE.

IRVING L. SRAGOW, *Primary Examiner.*